United States Patent
Hornback et al.

(10) Patent No.: US 10,883,405 B1
(45) Date of Patent: Jan. 5, 2021

(54) FLEXIBLE CONNECTION FOR MIXER ASSEMBLY

(71) Applicant: Faurecia Emissions Control Technologies, USA, LLC, Columbus, IN (US)

(72) Inventors: Jerome Hornback, Indianapolis, IN (US); Pierre-Yves Hallier, Shanghai (CN)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/587,955

(22) Filed: Sep. 30, 2019

(51) Int. Cl.
  *F01N 3/20* (2006.01)
  *F01N 3/28* (2006.01)

(52) U.S. Cl.
  CPC ............ *F01N 3/28* (2013.01); *F01N 3/2073* (2013.01)

(58) Field of Classification Search
  CPC ............ F01N 13/1827; F01N 13/1805; F01N 13/1811; F01N 13/141; F01N 13/1816; F01N 13/1838; F01N 3/103; F01N 3/208; F01N 3/2066; F16L 27/073; F16L 23/18
  USPC ......................... 60/274, 286, 295, 299–301
  See application file for complete search history.

(56) References Cited

U.S. PATENT DOCUMENTS

| | | | | |
|---|---|---|---|---|
| 3,492,030 A | * | 1/1970 | Lund | F16L 27/111 285/300 |
| 4,475,341 A | * | 10/1984 | Inoue | F01N 13/10 138/148 |
| 5,340,165 A | * | 8/1994 | Sheppard | F16L 27/111 285/226 |
| 5,782,506 A | * | 7/1998 | Uematsu | F01N 13/1816 285/227 |
| 6,419,280 B2 | * | 7/2002 | Uegane | F01N 13/1816 285/299 |
| 6,488,313 B1 | * | 12/2002 | Thomas | F01N 13/1816 285/236 |
| 8,353,152 B2 | | 1/2013 | Kowada et al. | |
| 9,151,208 B2 | * | 10/2015 | Schumnig | F01N 13/10 |
| 9,481,238 B2 | * | 11/2016 | Tiefenbacher | B62D 21/15 |
| 2010/0257850 A1 | * | 10/2010 | Kowada | F01N 13/141 60/297 |
| 2015/0101329 A1 | * | 4/2015 | Tiefenbacher | B62D 21/15 60/605.1 |
| 2018/0142604 A1 | * | 5/2018 | Niaz | B01D 53/944 |

FOREIGN PATENT DOCUMENTS

| EP | 3324017 A1 | 5/2018 |
|---|---|---|
| JP | 2006316691 A | 11/2016 |

* cited by examiner

*Primary Examiner* — Audrey K Bradley
*Assistant Examiner* — Dapinder Singh
(74) *Attorney, Agent, or Firm* — Carlson, Gaskey & Olds, P.C.

(57) ABSTRACT

An exhaust component assembly includes a first exhaust component extending along a first axis, a second exhaust component extending along a second axis, and a mixer having a mixer inlet portion connected to an outlet from the first exhaust component and a mixer outlet portion connected to an inlet to the second exhaust component. A flexible connection couples the mixer inlet portion to the mixer outlet portion.

23 Claims, 3 Drawing Sheets

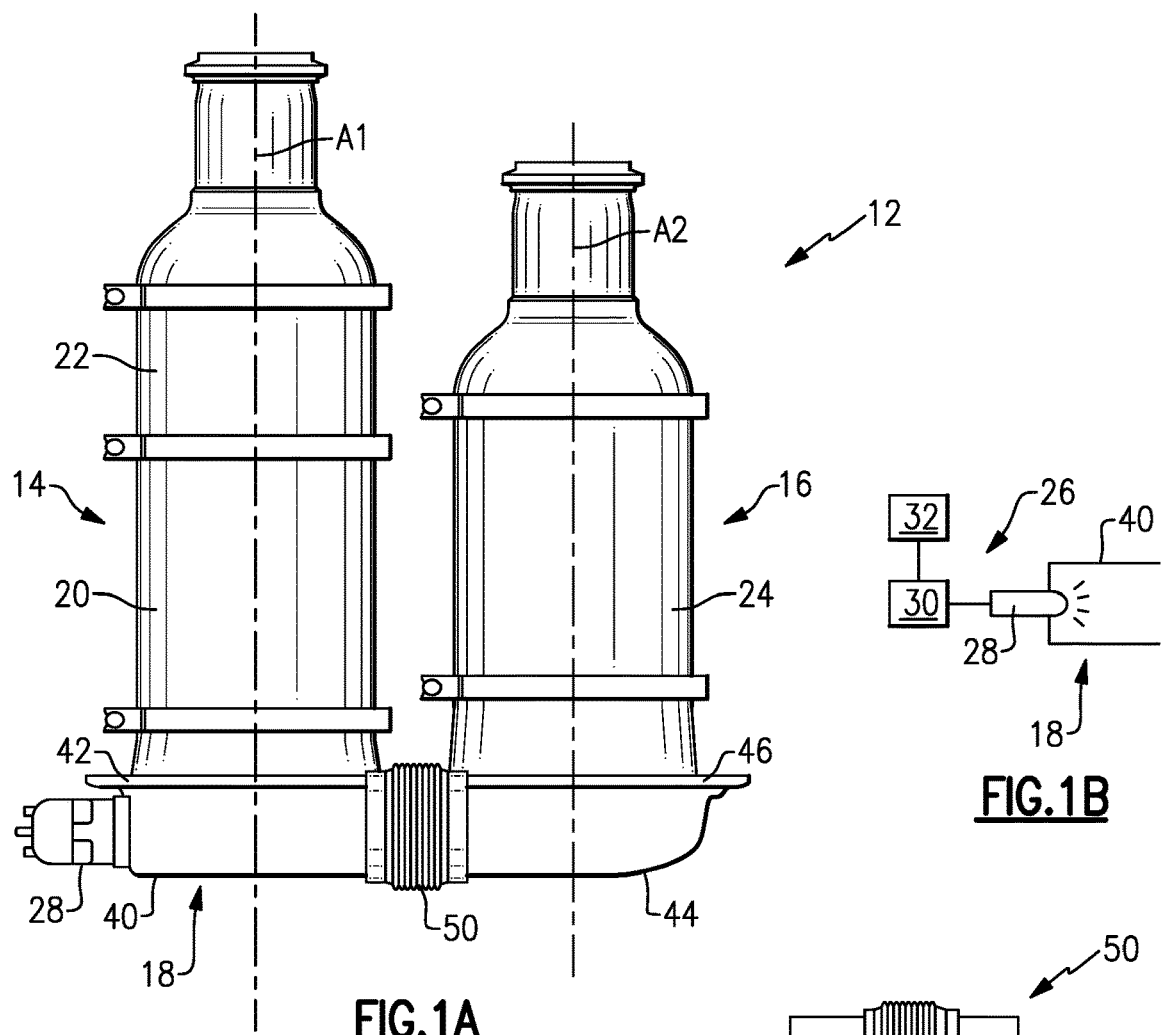
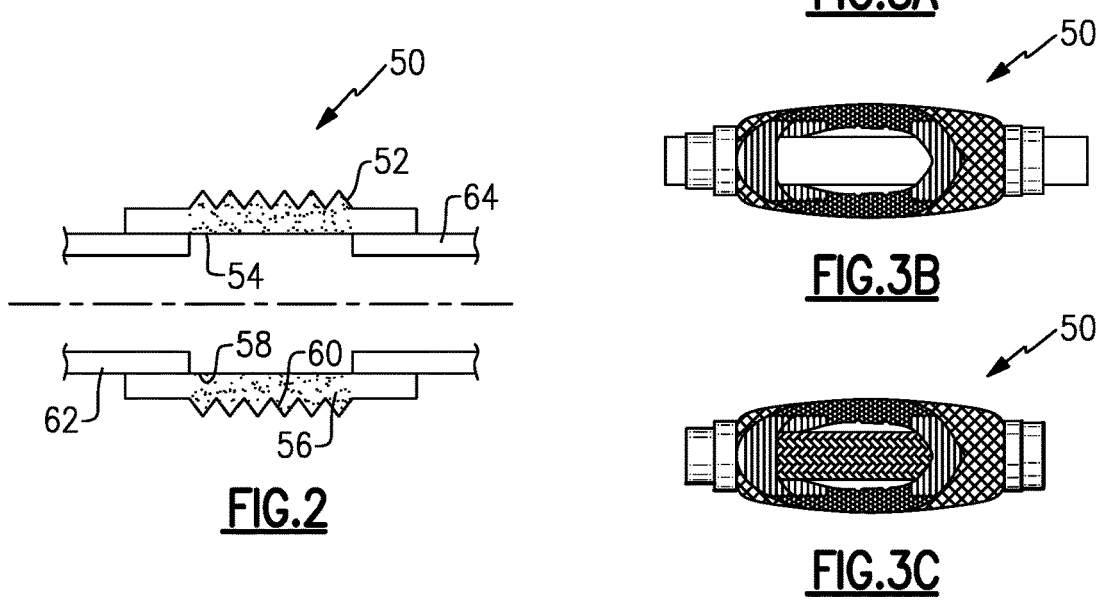

FLEXIBLE CONNECTION FOR MIXER ASSEMBLY

BACKGROUND OF THE INVENTION

An exhaust system conducts hot exhaust gases generated by an engine through various exhaust components to reduce emissions and control noise. The exhaust system may include a diesel particulate filter (DPF) that is configured to remove particulate contaminates from exhaust gas flow prior to the exhaust gases entering downstream exhaust system components. The system may also include a diesel oxidation catalyst (DOC) upstream of the DPF. In one known configuration, the exhaust system includes an injection system with a doser that injects a reducing agent, such as urea for example, into the exhaust gases downstream of the DPF/DOC and upstream of a selective catalytic reduction (SCR) catalyst. A mixer is positioned downstream of the DPF/DOC and upstream of the SCR catalyst and is configured to mix engine exhaust gases with urea injected by a doser prior to the exhaust stream entering the SCR catalyst.

In one known configuration, the various components are in an inline series configuration. However, certain tight packaging constraints can lead to splitting up the inline configuration into two separate modules. One module may need to be mounted in one of various different rotational positions relative to the other module. Current mounting solutions do not provide the desired mounting flexibility.

SUMMARY OF THE INVENTION

According to one exemplary embodiment, an exhaust component assembly includes a first exhaust component extending along a first axis, a second exhaust component extending along a second axis, and a mixer having a mixer inlet portion connected to an outlet from the first exhaust component and a mixer outlet portion connected to an inlet to the second exhaust component. A flexible connection couples the mixer inlet portion to the mixer outlet portion.

In another embodiment according to the previous embodiment, the flexible connection comprises a bellows.

In another embodiment according to any of the previous embodiments, an internal tube portion is surrounded by the bellows.

In another embodiment according to any of the previous embodiments, insulation is included between an outer surface of the internal tube portion and an inner surface of the bellows.

In another embodiment according to any of the previous embodiments, a first connection end connects the bellows to the mixer inlet portion and a second connection end connects the bellows to the mixer outlet portion, and wherein at least one of the first and second connection ends includes a spherical joint.

In another embodiment according to any of the previous embodiments, an injector injects fluid to mix with exhaust gas exiting the first exhaust component, wherein the injector is mounted to the mixer inlet portion.

In another embodiment according to any of the previous embodiments, the first exhaust component comprises a DOC catalyst and the second exhaust component comprises a SCR catalyst.

In another exemplary embodiment, an exhaust component assembly includes a first exhaust component extending along a first axis, a second exhaust component extending along a second axis that is non-coaxial with the first axis, and a mixer having a mixer inlet portion connected to an outlet from the first exhaust component and a mixer outlet portion connected to an inlet to the second exhaust component. An injector is configured to inject fluid to mix with exhaust gas exiting the first exhaust component, wherein the injector is mounted to the mixer inlet portion. A flexible bellows couples the mixer inlet portion to the mixer outlet portion.

In another embodiment according to any of the previous embodiments, the flexible bellows includes an internal tube surface to define a flow path for a mixture of exhaust gas and fluid exiting the mixer inlet portion.

In another embodiment according to any of the previous embodiments, insulating material is located radially outwardly of the internal tube surface and radially inwardly of the flexible bellows.

In another embodiment according to any of the previous embodiments, the first and second axes are parallel to each other.

In another embodiment according to any of the previous embodiments, the first and second axes are perpendicular to each other.

In another embodiment according to any of the previous embodiments, the mixer inlet portion encloses a downstream end of the first exhaust component and wherein the mixer outlet portion encloses an upstream end of the second exhaust component.

These and other features of the present invention can be best understood from the following specification and drawings, the following of which is a brief description.

BRIEF DESCRIPTION OF THE DRAWINGS

FIG. 1A shows one example of a vehicle exhaust component assembly with two modules and a mixer having a flexible connection.

FIG. 1B shows a schematic view of an injection system for the mixer of FIG. 1A.

FIG. 2 is a schematic view of the flexible connection of FIG. 1A.

FIG. 3A shows one example of a flexible connection that comprises a bellows.

FIG. 3B shows another example of a flexible connection.

FIG. 3C shows another example of a flexible connection.

DETAILED DESCRIPTION

Figure 4A:
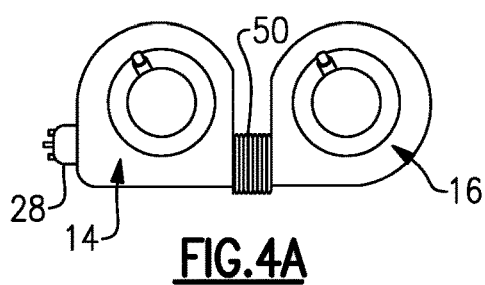
FIG. 4A is a top view of a mounting orientation as shown in FIG. 1A.

FIG. 1A shows one example of a vehicle exhaust system 12 that conducts high temperature exhaust gases generated by an engine (not shown) through various exhaust components to reduce emissions and control noise as known. In the example shown in FIG. 1, a first exhaust component assembly or first module 14 extends along a first axis A1 and a second exhaust component assembly or second module 16 extends along a second axis A2 that is spaced apart and parallel to the first axis A1. A mixer 18 connects a component outlet from the first module 14 to a component inlet of the second module 16. Further, due to the parallel configuration of the two modules 14, 16, the mixer 18 also serves as a flow reversing device.

In one example configuration, the first module 14 includes a diesel particulate filter (DPF) 20 and a diesel oxidation catalyst (DOC) 22 that is upstream of the DPF 20. The DPF 20 is configured to remove particulate contaminates from exhaust gas flow prior to the exhaust gases entering downstream exhaust system components. The DOC 22 converts exhaust gas pollutants, such as carbon monoxide for example, into substances such as carbon dioxide and water. In this example, the second module 16 includes a selective catalytic reduction (SCR) catalyst 24. As known, SCR technology allows nitrogen oxide (NOx) reduction reactions to take place in an oxidizing atmosphere. The levels of NOx are reduced using a reducing agent, such as urea for example. The reducing agent reacts with NOx to convert the pollutants into nitrogen, water, and small amounts of carbon dioxide (CO2).

In one example configuration shown in FIG. 1B, the exhaust system 10 includes an injection system 26 with an injector or doser 28 that injects a reducing agent, such as a solution of urea and water for example, into the exhaust gases downstream of the DPF 20 and upstream the SCR catalyst 24. The mixer 18 is positioned upstream of the SCR catalyst 24 and mixes engine exhaust gases with the injected reducing agent. The doser 28 is mounted to an outer peripheral surface of the mixer 18. In one example, the doser 28 is mounted to an upstream portion of the mixer 18. The doser 28 receives fluid from a fluid supply 30 and a controller 32 controls injection of the fluid as known.

In one example, the mixer 18 has a mixer inlet portion 40 connected to an outlet 42 from the first module 14 and a mixer outlet portion 44 connected to an inlet 46 to the second module 16. A flexible connection 50 couples the mixer inlet portion 40 to the mixer outlet portion 44. In one example, the flexible connection 50 is offset relative to a center of the mixer inlet and outlet portions 40, 44 (see FIGS. 4C-4D for example). The doser 28 is mounted to the mixer inlet portion 40 and injects the reducing agent into exhaust gas flow exiting the first module 14.

In one example, the flexible connection 50 comprises a bellows 52 as shown in FIGS. 2 and 3A-C. An internal tube portion 54 is surrounded by the bellows 52. Insulation 56 may be included between an outer surface 58 of the internal tube portion and an inner surface 60 of the bellows 52. A first connection end 62 of the mixer inlet portion 40 connects the bellows 52 to the mixer inlet portion 40 and a second connection end 64 of the mixer outlet portion 44 connects the bellows 52 to the mixer outlet portion 44.

FIG. 3A shows an example of a flexible connection 50 that includes a bellows 52 surrounding an internal pipe portion. FIGS. 3B and 3C show other flexible configurations with an inner tube surrounded by flexible layers and insulation.

Figure 6A:
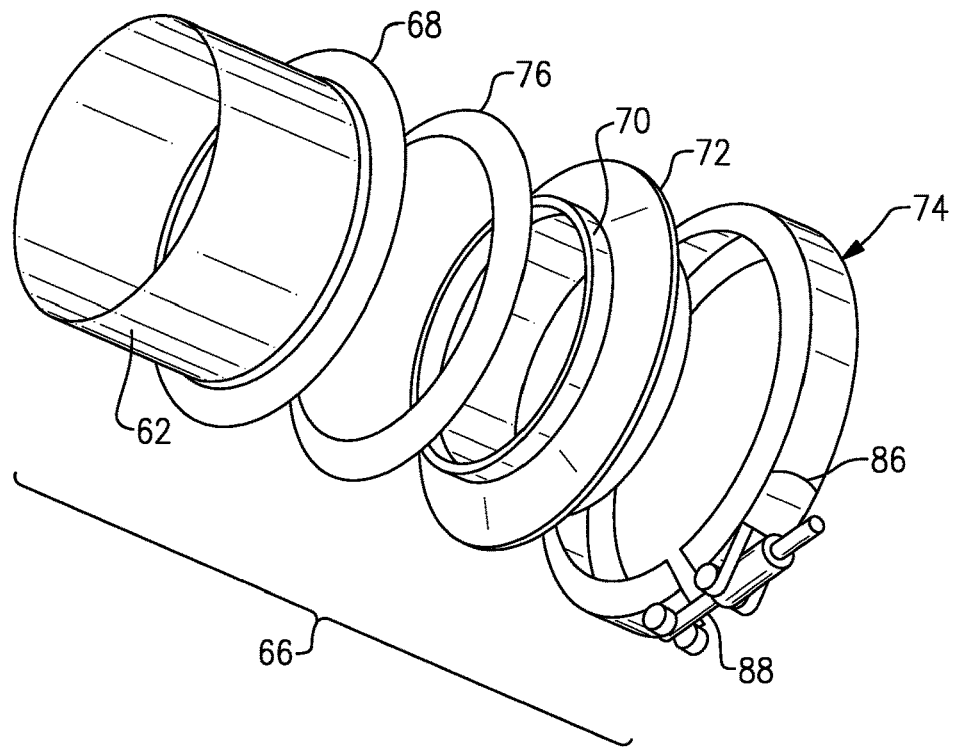
FIG. 6A is an exploded view of one example of a flexible connection comprising a spherical joint.
Figure 6B:
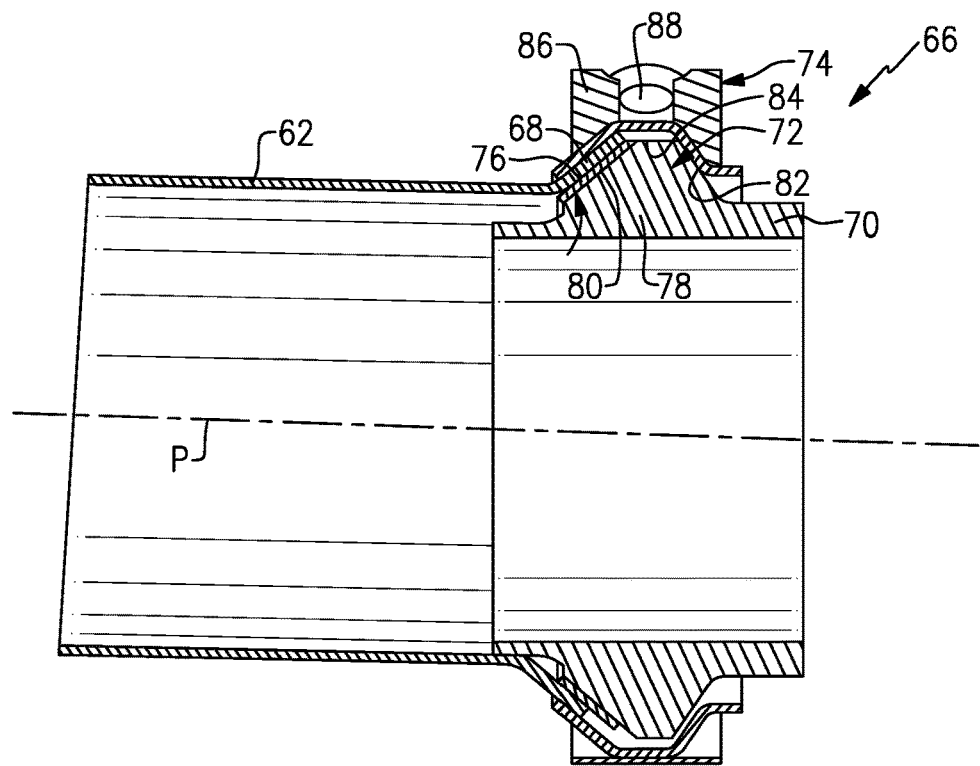
FIG. 6B is a side cross-section view of the assembled spherical joint of FIG. 6A.

In one example, one or both of these connection interfaces may include a spherical joint 66 as shown in FIGS. 6A-6B. Optionally, the spherical joint 66 could be used as the flexible connection 50. In one example, the first 62 and/or second 64 connection end includes a flared end 68 that extends radially outward from a pipe center axis P. A tubular portion 70 includes a protruding surface 72 that is coupled to the flared end 68 with a clamp 74. A sealing member 76 is located between the flared end 68 and the protruding surface 72.

The protruding surface 72 is formed by a radially enlarged portion 78 of the tubular portion 70. The protruding surface 72 includes a first ramped portion 80 extending radially outward and a second ramped portion 82 extending radially inward. A straight section 84 of the protruding surface 72 connects the first 80 and second 82 ramped portions. The flared end 68 extends at an angle similar to that of the first ramped portion 80. The clamp 74 includes a ring 86 with an inner ramped surface that corresponds to the flared end 68 such that the flared end 68 is clamped firmly between the clamp ring 86 and the tubular portion 70 when a clamp fastener 88 is tightened as shown in FIG. 6B. Another connection end can be connected to the tubular portion 70 along the second ramped portion 82 in a manner similar to that shown at the first ramped portion 80.

The flexible connection 50 allows flexible movement and rotational orientation to reduce stress for non-planar, u-shaped, and double can configurations. An outer sealing surface is provided with the bellows 52 and/or flex joint and the inner tube portion 54 is used to provide for urea decomposition and transfer of exhaust gas. The additional insulation 56 between the bellows 52 and the tube portion 54 provides an additional thermal barrier to increase heat retention in the decomposition volume to help mitigate deposit formation. The additional insulation 56 also reduces outer skin temperature and reduces stress between the two module planes. Further, the tube in bellows configuration provides for a smooth single axis flow of fluid injected into the exhaust gas stream. The use of a coupling, such as the spherical joint for example, allows for quick connection and can accommodate minor offsets in alignment between the two module planes.

Figure 4C:
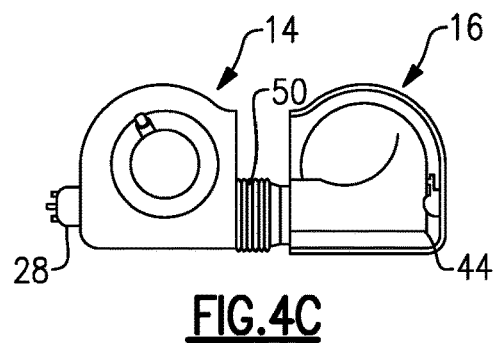
FIG. 4C is a view similar to 4A but having one module rotated 180 degrees and being in-line.
Figure 4B:
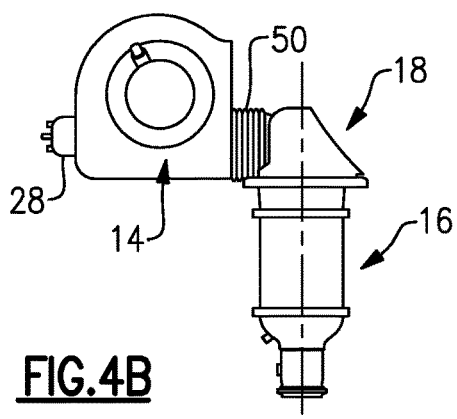
FIG. 4B is a view similar to 4A but having one module rotated ninety degrees.
Figure 4D:
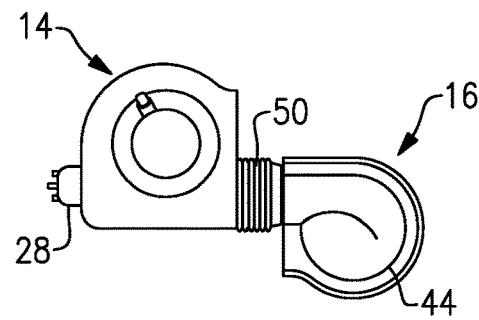
FIG. 4D is a view similar to 4C but in an offset configuration.

FIGS. 4A-4D and 5A-5C show examples of possible mounting configurations that can be easily provided by using the flexible coupling 50. FIG. 4A is a top view of a mounting orientation as shown in FIG. 1A. In this example, the first A2 and second A2 axes are non-coaxial and are parallel to each other to form a U-shaped configuration. FIG. 4B is a view similar to 4A but has the second module 16 rotated ninety degrees relative to the first module 14. In this example, the second axis A2 is perpendicular to the first axis A1. FIG. 4C is a view similar to 4A but the second module 16 is rotated 180 degrees relative to the first module 14 and is in-line with the first module 14. FIG. 4D is a view similar to 4C but is in an offset configuration with the second module 16 being offset relative to the first module 14.

Figure 5A:
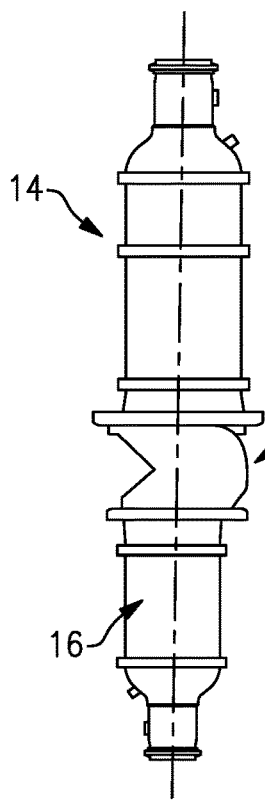
FIG. 5A is a side view showing one module rotated 180 degrees relative to the other module.
Figure 5B:
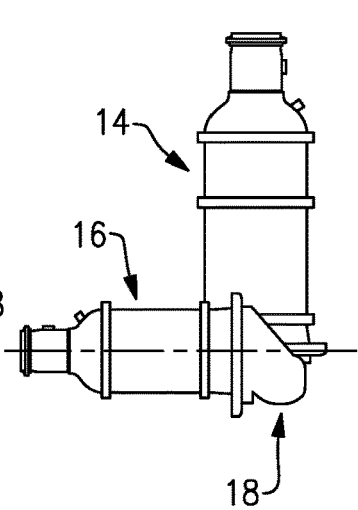
FIG. 5B is a view similar to FIG. 5A but showing a short ninety degree rotation configuration.
Figure 5C:
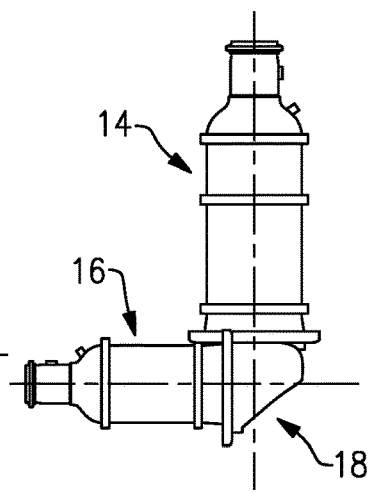
FIG. 5C is a view similar to FIG. 5A but showing a long ninety degree rotation configuration.

FIG. 5A is a side view showing the first module 14 rotated 180 degrees relative to the second module 16. The first A1 and second A2 axes are coaxial in this configuration. FIG. 5B is a view similar to FIG. 5A but shows a short ninety degree rotation configuration of the second module 16 relative to the first module 14. FIG. 5C is a view similar to FIG. 5A but shows a long ninety degree rotation configuration of the second module 16 relative to the first module 14.

The disclosed flexible connection 50 reduces stress in situations where the mounting structure is not rigid or where there is misalignment that can increase stress at an interface joint. The flexible connection 50 also accepts misalignment of components to avoid residual stresses during manufacturing or servicing.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. An exhaust component assembly comprising:
   a first exhaust component extending along a first axis, the first exhaust component having an upstream end that receives engine exhaust gases and a downstream end;
   a second exhaust component extending along a second axis, the second exhaust component having an upstream end and a downstream end;
   a mixer having a mixer inlet portion connected to the downstream end of the first exhaust component to enclose the downstream end of the first exhaust component and a mixer outlet portion connected to the upstream end of the second exhaust component to enclose the upstream end of the second exhaust component such that the mixer transfers the engine exhaust gases from an outlet of the first exhaust component to an inlet of the second exhaust component;
   a first connection end extending from the mixer inlet portion toward the mixer outlet portion along a third axis;
   a second connection end extending from the mixer outlet portion toward the mixer inlet portion along the third axis and axially spaced apart from the first connection end; and
   a flexible connection coupling the first connection end of the mixer inlet portion to the second connection end of the mixer outlet portion.

2. The exhaust component assembly according to claim 1 wherein the flexible connection comprises a bellows.

3. The exhaust component assembly according to claim 2 including an internal tube portion surrounded by the bellows.

4. The exhaust component assembly according to claim 3 including insulation between an outer surface of the internal tube portion and an inner surface of the bellows.

5. The exhaust component assembly according to claim 2 in wherein the first connection end connects the bellows to the mixer inlet portion and the second connection end connects the bellows to the mixer outlet portion, and wherein at least one of the first and second connection ends includes a spherical joint.

6. The exhaust component assembly according to claim 5 wherein both of the first and second connection ends include a spherical joint.

7. The exhaust component assembly according to claim 5 wherein the at least one of the first and second connection ends includes a flared end, and wherein the spherical joint includes tubular portion with a protruding surface that is coupled to the flared end with a clamp.

8. The exhaust component assembly according to claim 7 wherein the spherical joint includes a sealing member between the flared end and the protruding surface.

9. The exhaust component assembly according to claim 1 wherein the flexible connection comprises at least one spherical joint.

10. The exhaust component assembly according to claim 1 including an injector to inject fluid to mix with exhaust gas exiting the first exhaust component, wherein the injector is mounted to the mixer inlet portion.

11. The exhaust component assembly according to claim 1 wherein the second axis is non-coaxial with the first axis and wherein the first and second axes are parallel to each other, and wherein the third axis is non-parallel with the first and second axes.

12. The exhaust component assembly according to claim 1 wherein the second axis is non-coaxial with the first axis and wherein the first and second axes are perpendicular to each other, and wherein the third axis is non-parallel with the first and second axes.

13. The exhaust component assembly according to claim 1 wherein the first exhaust component comprises a DOC catalyst and the second exhaust component comprises a SCR catalyst.

14. The exhaust component assembly according to claim 1 wherein the flexible bellows coupling allows flexible movement and rotational orientation between the first and second exhaust components to allow the first and second axes to be selectively orientated in a plurality of different configurations relative to each other.

15. The exhaust component assembly according to claim 1 wherein the first exhaust component comprises a first outer housing for a first catalyst substrate and the second exhaust component comprises a second outer housing for a second catalyst substrate, and wherein the mixer inlet portion comprises a first end housing that encloses the downstream end of the first outer housing and the mixer outlet portion comprises a second end housing that encloses the upstream end of the second outer housing and wherein the flexible connection extends across an axial space between an end of the second connection end and an end of the first connection end to connect the first and second connection ends together.

16. An exhaust component assembly comprising:
   a first exhaust component extending along a first axis, the first exhaust component having an upstream end that receives engine exhaust gases and a downstream end;
   a second exhaust component extending along a second axis that is non-coaxial with the first axis, the second exhaust component having an upstream end and a downstream end;
   a mixer having a mixer inlet portion connected to the downstream end of the first exhaust component to enclose the downstream end of the first exhaust component and a mixer outlet portion connected to the upstream end of the second exhaust component to enclose the upstream end of the second exhaust component such that the mixer transfers the engine exhaust gases from an outlet of the first exhaust component to an inlet of the second exhaust component;
   a first connection end extending from the mixer inlet portion toward the mixer outlet portion along a third axis;
   a second connection end extending from the mixer outlet portion toward the mixer inlet portion along the third axis and axially spaced apart from the first connection end;
   an injector to inject fluid to mix with exhaust gas exiting the first exhaust component, wherein the injector is mounted to the mixer inlet portion; and a flexible bellows coupling the first connection end of the mixer inlet portion to the second connection end of the mixer outlet portion.

17. The exhaust component assembly according to claim 16 wherein the flexible bellows includes an internal tube surface to define a flow path for a mixture of exhaust gas and fluid exiting the mixer inlet portion.

18. The exhaust component assembly according to claim 17 including insulating material located radially outwardly of the internal tube surface and radially inwardly of the flexible bellows.

19. The exhaust component assembly according to claim 17 wherein the first connection end connects one end of the bellows to the mixer inlet portion and the second connection end connects an opposite end of the bellows to the mixer outlet portion, and wherein at least one of the first and second connection ends includes a spherical joint.

20. The exhaust component assembly according to claim 16 wherein the first and second axes are parallel to each other.

21. The exhaust component assembly according to claim 16 wherein the first and second axes are perpendicular to each other.

22. The exhaust component assembly according to claim 16 wherein the flexible bellows coupling allows flexible movement and rotational orientation between the first and second exhaust components to allow the first and second axes to be selectively orientated in a plurality of different configurations relative to each other, and wherein the third axis is non-parallel with the first and second axes.

23. The exhaust component assembly according to claim 16 wherein the first exhaust component comprises a first outer housing for a first catalyst substrate and the second exhaust component comprises a second outer housing for a second catalyst substrate, and wherein the mixer inlet portion comprises a first end housing that encloses the downstream end of the first outer housing and the mixer outlet portion comprises a second end housing that encloses the upstream end of the second outer housing and wherein the flexible bellows coupling extends across an axial space between an end of the second connection end and an end of the first connection end to connect the first and second connection ends together.

\* \* \* \* \*